US012743748B2

(12) United States Patent
Takada

(10) Patent No.: US 12,743,748 B2
(45) Date of Patent: Sep. 22, 2026

(54) INFORMATION PROCESSING APPARATUS, INFORMATION PROCESSING METHOD, AND SYSTEM

(71) Applicant: CANON KABUSHIKI KAISHA, Tokyo (JP)

(72) Inventor: Yosuke Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 18/609,623

(22) Filed: Mar. 19, 2024

(65) Prior Publication Data

US 2024/0320800 A1 Sep. 26, 2024

(30) Foreign Application Priority Data

Mar. 22, 2023 (JP) ................................ 2023-046064

(51) Int. Cl.

| | |
|---|---|
| ***G06K 9/00*** | (2022.01) |
| ***G06T 5/60*** | (2024.01) |
| ***G06T 5/70*** | (2024.01) |

(52) U.S. Cl.

CPC .................. *G06T 5/60* (2024.01); *G06T 5/70* (2024.01); *G06T 2207/20081* (2013.01); *G06T 2207/20084* (2013.01)

(58) Field of Classification Search

CPC ... G06T 5/60; G06T 5/70; G06T 2207/20081; G06T 2207/20084

See application file for complete search history.

(56) References Cited

U.S. PATENT DOCUMENTS

| | | | | |
|---|---|---|---|---|
| 2005/0185837 | A1* | 8/2005 | Takano | H04N 1/6058 382/162 |
| 2011/0304330 | A1* | 12/2011 | Yoneda | G01R 33/56 324/309 |
| 2022/0345606 | A1* | 10/2022 | Sato | G06V 20/58 |

FOREIGN PATENT DOCUMENTS

| | | |
|---|---|---|
| JP | 2018006765 A | 1/2018 |

* cited by examiner

*Primary Examiner* — Duy M Dang

(74) *Attorney, Agent, or Firm* — Canon U.S.A., Inc. IP Division

(57) ABSTRACT

An information processing apparatus configured to reduce noise in an image using a trained neural network includes at least one processor and at least one memory having instructions stored thereon that, when executed by the at least one processor, cause the at least one processor and the at least one memory to cooperate to adjust a black floating of an input image so as to be closer to a black floating of an image used at a time of training of the neural network, and perform inference processing on a noise-reduced image of the adjusted image, using the neural network trained to suppress the black floating.

11 Claims, 12 Drawing Sheets

200
CLOUD SERVER
201
CPU
202
ROM
203
RAM
204
LARGE-CAPACITY STORAGE DEVICE
206
205
NETWORK I/F
INTERNET
100
EDGE DEVICE
101
CPU
102
RAM
103
ROM
104
LARGE-CAPACITY STORAGE DEVICE
106
NETWORK I/F
107
105
GENERAL-PURPOSE I/F
IMAGE CAPTURING APPARATUS
INPUT APPARATUS
EXTERNAL STORAGE APPARATUS
DISPLAY APPARATUS
10
20
30
40

PROBABILITY DENSITY
OFFSET
PIXEL VALUE
DIGITAL GAIN

PROBABILITY DENSITY
OFFSET
PIXEL VALUE
0 CLIP

PROBABILITY DENSITY
NORMAL AVERAGE VALUE
ACTUAL AVERAGE VALUE
OFFSET
PIXEL VALUE

INFERENCE
116
INPUT IMAGE
501
CNN
502
INFERENCE RESULT

TRAINING
503
TEACHER IMAGE GROUP
STUDENT IMAGE GROUP
ADDED NOISE INFORMATION
504
STUDENT IMAGE
505
TEACHER IMAGE
501
CNN
508
UPDATE
506
TRAINING RESULT
507
LOSS

NOISE CHARACTERISTIC ANALYSIS RESULT OF IMAGE CAPTURING APPARATUS
DISPERSION
BRIGHTNESS
NOISE
TEACHER IMAGE GROUP
TEACHER IMAGE
STUDENT IMAGE
TEACHER IMAGE GROUP
STUDENT IMAGE GROUP
PAIR

NOISE REDUCTION

INFORMATION PROCESSING APPARATUS, INFORMATION PROCESSING METHOD, AND SYSTEM

BACKGROUND

Field

The present disclosure relates to an image processing technique for reducing noise in a captured image.

Description of the Related Art

As a system to achieve higher sensitivity of an image sensor, there is a method of applying an analog gain and a digital gain to an image signal output from the image sensor. In general, it is known that the effect of noise tends to be larger when these gains are applied.

In particular, in a dark area of an image obtained at high sensitivity, a phenomenon (called black floating), in which an area that should normally be black increases in brightness and becomes nearly gray due to the effect of noise, occurs.

The degree of the black floating varies depending on a difference in a noise amount due to temperature changes or individual differences of the image sensors. In response, Japanese Patent Application Laid-Open No. 2018-006765 discusses a technique of detecting, as black pixels, pixels having pixel values less than or equal to a predetermined threshold value for each frame before applying a digital gain.

Then, variation of a black floating amount is suppressed by adjusting an offset based on the number of black pixels in a current frame and the number of black pixels in a previous frame.

Further, it is known that noise is reduced while the black floating is suppressed using a deep neural network (DNN).

SUMMARY

According to an aspect of the present disclosure, an information processing apparatus configured to reduce noise in an image using a trained neural network includes at least one processor and at least one memory having instructions stored thereon that, when executed by the at least one processor, cause the at least one processor and the at least one memory to cooperate to adjust a black floating of an input image so as to be closer to a black floating of an image used at a time of training of the neural network, and perform inference processing on a noise-reduced image of the adjusted image, using the neural network trained to suppress the black floating.

Further features of the present disclosure will become apparent from the following description of exemplary embodiments with reference to the attached drawings.

DESCRIPTION OF THE EMBODIMENTS

Figure 1:
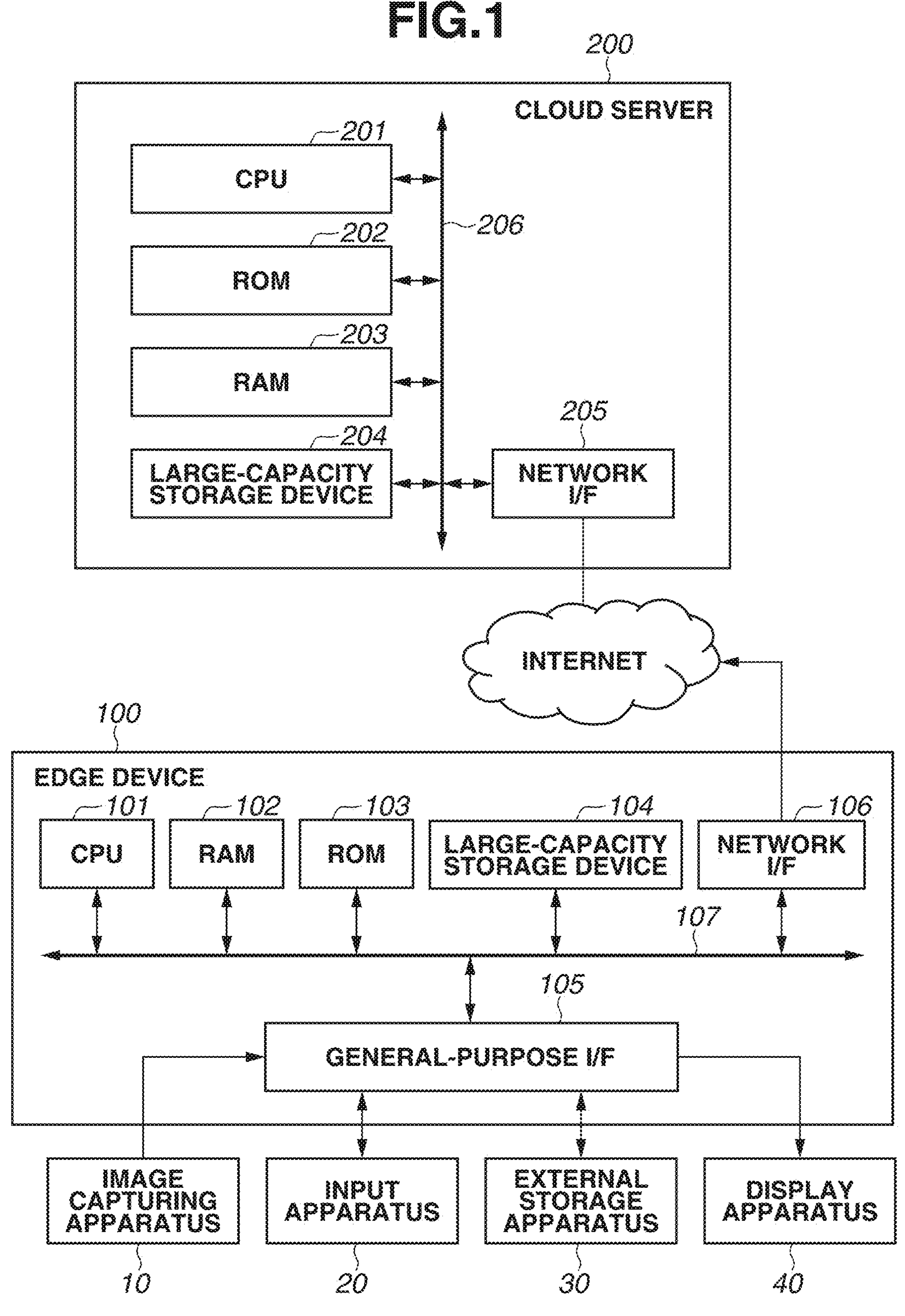
FIG. 1 is a block diagram illustrating a configuration example of an information processing system.

The method discussed in Japanese Patent Application Laid-Open No. 2018-006765 is robust against temperature changes of a same sensor, but it is difficult to deal with individual differences between sensors. Thus, there is an issue that the technique discussed therein is limited to a learned sensor in a case where noise is to be reduced using a deep neural network (DNN).

Further, there is an issue that noise cannot be appropriately reduced if black floating amounts are different between the times of training and inference, in the case where noise is to be reduced using the DNN.

Hereinbelow, exemplary embodiments of the present disclosure will be described with reference to the attached drawings. Configurations described in the following exemplary embodiments are merely examples, and the present disclosure is not limited thereto.

<Convolutional Neural Network (CNN)>

First, the CNN appearing in each exemplary embodiment described below and generally used in the image processing technique to which deep learning is applied will be described. The CNN is a technique of repeating processing of performing convolution of a filter, generated through a training (or learning), on image data and then performing a non-linear operation thereon. The filter is also referred to as a local receptive field. Image data obtained by the non-linear operation after performing the convolution of the filter on the image data is referred to as a feature map. In addition, the training is performed using training data (training images or data sets) including pairs of input image data and output image data. Simply stated, the training is to generate, from the training data, a filter value that can highly accurately convert the input image data into corresponding output image data. Details thereof will be described below.

In a case where the image data includes red, green, and blue (RGB) color channels or a feature map includes a plurality of pieces of image data, the filter used for convolution correspondingly includes a plurality of channels. As a result, the convolution filter is expressed by a four-dimensional (4D) array including the number of channels in addition to vertical and horizontal dimensions and the number of filters. After the convolution of the filter is performed on the image data (or feature map), processing of the non-linear operation is expressed in unit of layer, such as an n-th layer feature map, or an n-th layer filer. Further, for example, the CNN repeating the filter convolution and the non-linear operation three times has a three layer network structure. Such non-linear operation processing is formulated as a following formula (1).

$$X_n^{(l)} = f\left(\sum_{n=1}^{N} W_n^{(l)} * X_{n-1}^{(l)} + b_n^{(l)}\right) \quad (1)$$

In the above formula (1), "$W_n$" is an n-th layer filter, "$b_n$" is an n-th layer bias, "f" is a non-linear operator, "$X_n$" is an n-th layer feature map, and "*" is a convolution operator. In addition, (l) on the upper right of each of the "$W_n$", "$b_n$", "$X_n$", and "$X_{n-1}$" indicates an l-th filter or an l-th feature map. The filter and the bias are generated through a training described below and collectively referred to as a "network parameter".

For example, as the non-linear operation, a sigmoid function or a rectified linear unit (ReLU) is used. In the case of ReLU, the non-linear operation is expressed by a following formula (2).

$$f(X) = \begin{cases} X & \text{if } 0 \le X \\ 0 & \text{otherwise} \end{cases} \quad (2)$$

As indicated by the above formula (2), negative elements of input vectors X are "0", and positive elements thereof remain as they are.

As a network using the CNN, a Residual Neural Network (ResNet) in the image recognition field and a Residual Encoder-Decoder Network (RED-Net) which is an application thereof in the super-resolution field are widely known. Both of them achieve the high processing accuracy by making the CNN multilayered and repeating the filter convolution many times. For example, the ResNet features the network structure provided with a path shortcutting convolution layers to achieve the multilayer network of as many as 152 layers. With this structure, the ResNet achieves highly accurate recognition having a recognition rate close to that of humans.

In addition, the processing becomes highly accurate by the multilayered CNN because, in simplified terms, a non-linear relationship between the input and the output can be expressed by repeating the non-linear operation many times.

<Training of CNN>

Next, the training of the CNN will be described. In general, the training of the CNN is performed by minimizing an objective function expressed by a following formula (3) with respect to the training data including pairs of input training image (student image) data and corresponding output training image (teacher image) data.

$$L(0) = \frac{1}{n}\sum_{i=1}^{n} \|F(X_i; 0) - Y_i\|_2^2 \quad (3)$$

In the above formula (3), "L" is a loss function for measuring an error between a correct answer and an estimated answer. Further, "$Y_i$" is i-th output training image data, and "$X_i$" is i-th input training image data. Further, "F" is a function collectively expressing the operation (formula (1)) performed in each layer of the CNN. Further, "θ" is a network parameter (filter and bias). Further, $|Z|_2$ is an L2 norm, and is, in simplified terms, a square root of the sum of squares of the elements of a vector Z. Further, "n" is a total number of pieces of training data used for the training. In general, since the total number of pieces of training data is large, in a stochastic gradient descent (SGD) method, a part of training image data is selected at random and used for the training. In this way, a calculation load in the training using many pieces of training data can be reduced. Further, as a minimization (optimization) method of the objective function, various methods, such as a momentum method, an adaptive gradient (AdaGrad) method, an adaptive delta (AdaDelta) method, and an adaptive moment estimation (Adam) method, are known. The Adam method is expressed by a following formula (4).

$$\begin{aligned} g &= \frac{\partial L}{\partial \theta_1^t} \\ m &= \beta_l m + (1-\beta_1)g \\ v &= \beta_2 v + (1-\beta_2)g^2 \\ \theta_i^{t+1} &= \theta_i^t - \alpha\frac{\sqrt{1-\beta_2^t}}{(1-\beta_1)}\frac{m}{(\sqrt{v} + \in \varepsilon)} \end{aligned} \quad (4)$$

In the above formula (4), "$\theta_i^t$" is an i-th network parameter in a t-th repetition, and "g" is a gradient of the loss function L regarding $\theta_i^t$. Further, "m" and "v" are moment vectors, "α" is a base training rate, "β1" and "β2" are hyper parameters, and "F" is a small constant. In addition, since there is no selection indicator of an optimization method in the training, any method may be used basically. However, it is known that the training time is different because the convergence time is different depending on the method.

In a first exemplary embodiment, a method of reducing noise and appropriately reducing a black floating of an input image in which a black floating different from that at a training time is generated will be described, using a trained neural network obtained by learning noise reduction (hereinbelow, referred to as a trained model).

<Configuration Example of Information Processing System>

FIG. 1 is a block diagram illustrating a hardware configuration example of an information processing system according to the present exemplary embodiment. In the information processing system illustrated in FIG. 1, a cloud server 200 and an edge device 100 are connected via the Internet. The cloud server 200 plays a role of generating training data and of performing training to reduce noise (hereinbelow, referred to as NR training), and the edge device 100 plays a role of performing inference processing for reducing noise (hereinbelow, referred to as NR inference) using the trained model.

<Hardware Configuration of Edge Device>

The edge device 100 according to the present exemplary embodiment is an information processing apparatus that performs the NR inference on RAW image data (Bayer array) input from an image capturing apparatus 10 using a trained model provided from the cloud server 200. A user reduces noise in the RAW image data using an image processing application installed in the edge device 100. The edge device 100 includes a central processing unit (CPU) 101, a random access memory (RAM) 102, a read only memory (ROM) 103, a large-capacity storage device 104, a general-purpose interface (I/F) 105, and a network I/F 106, which are connected with each other via a system bus 107. Further, the edge device 100 is also connected to the image capturing apparatus 10, an input apparatus 20, an external storage apparatus 30, and a display apparatus 40 via the general-purpose I/F 105.

The CPU 101 executes a program stored in the ROM 103 using the RAM 102 as a work memory to comprehensively control each component of the edge device 100 via the system bus 107. Further, the large-capacity storage device 104 is a hard disk drive (HDD) or a solid-state drive (SSD) and stores various kinds of data used in the edge device 100. The CPU 101 writes data into the large-capacity storage device 104 and reads data stored in the large-capacity storage device 104 via the system bus 107. For example, the general-purpose I/F 105 is a serial bus interface for a universal serial bus (USB), an Institute of Electrical and Electronics Engineers (IEEE) 1394, a high-definition multimedia interface (HDMI®), and the like. The edge device 100 acquires data via the general-purpose I/F 105 from the external storage apparatus 30 (e.g., various storage media such as a memory card, a CompactFlash® (CF) card, a Secure Digital (SD) card, and a USB memory). Further, the edge device 100 receives a user instruction from the input apparatus 20, such as a mouse and a keyboard, via the general-purpose I/F 105. Further, the edge device 100 outputs image data or the like processed by the CPU 101 to the display apparatus 40 (various kinds of image display device, such as a liquid crystal display) via the general-purpose I/F 105. Further, the edge device 100 acquires data of a captured image (RAW image), serving as a noise reduction target, from the image capturing apparatus 10, serving as an imaging apparatus, via the general-purpose I/F 105. The network I/F 106 is an interface to connect to the Internet. The edge device 100 accesses the cloud server 200 using an installed web browser to acquire a network parameter for the NR inference.

<Hardware Configuration of Cloud Server>

The cloud server 200 according to the present exemplary embodiment is a server apparatus that provides cloud services on the Internet. More specifically, the cloud server 200 provides a trained model obtained by generating training data, performing an NR training, and storing a network parameter and a network structure of a training result, in response to a request from the edge device 100. The cloud server 200 includes a CPU 201, a ROM 202, a RAM 203, a large-capacity storage device 204, and a network I/F 205, which are connected with each other via a system bus 206. The CPU 201 controls the entire cloud server 200 by reading a control program stored in the ROM 202 and executing the read program to perform various kinds of processing. The RAM 203 is used as a main memory of the CPU 201, and a temporary storage area such as a work area. The large-capacity storage device 204 is a large capacity secondary storage device such as an HDD and an SSD for storing image data and various programs. The network I/F 205 is an interface to connect to the Internet and provides the above-described trained model in response to a request from a web browser of the edge device 100.

The components of the edge device 100 and the cloud server 200 may be configured in different forms from the above-descried configurations. Further, in the present exemplary embodiment, it is assumed that the cloud server 200 performs the generation of the training data and the NR training, and the edge device 100 downloads the trained model, which is the training result, to perform the NR inference on the RAW image data. However, the above-described system configuration is just an example, and the system configuration is not limited thereto. For example, the system may be configured in such a manner that the functions of the cloud server 200 are subdivided and the generation of the training data and the NR training are performed by different apparatuses. Further, the system may be configured in such a manner that the image capturing apparatus 10 having both functions of the edge device 100 and the cloud server 200 performs all the training data generation, the NR training, and the NR inference.

<Functional Blocks of Entire System>

Figure 2:
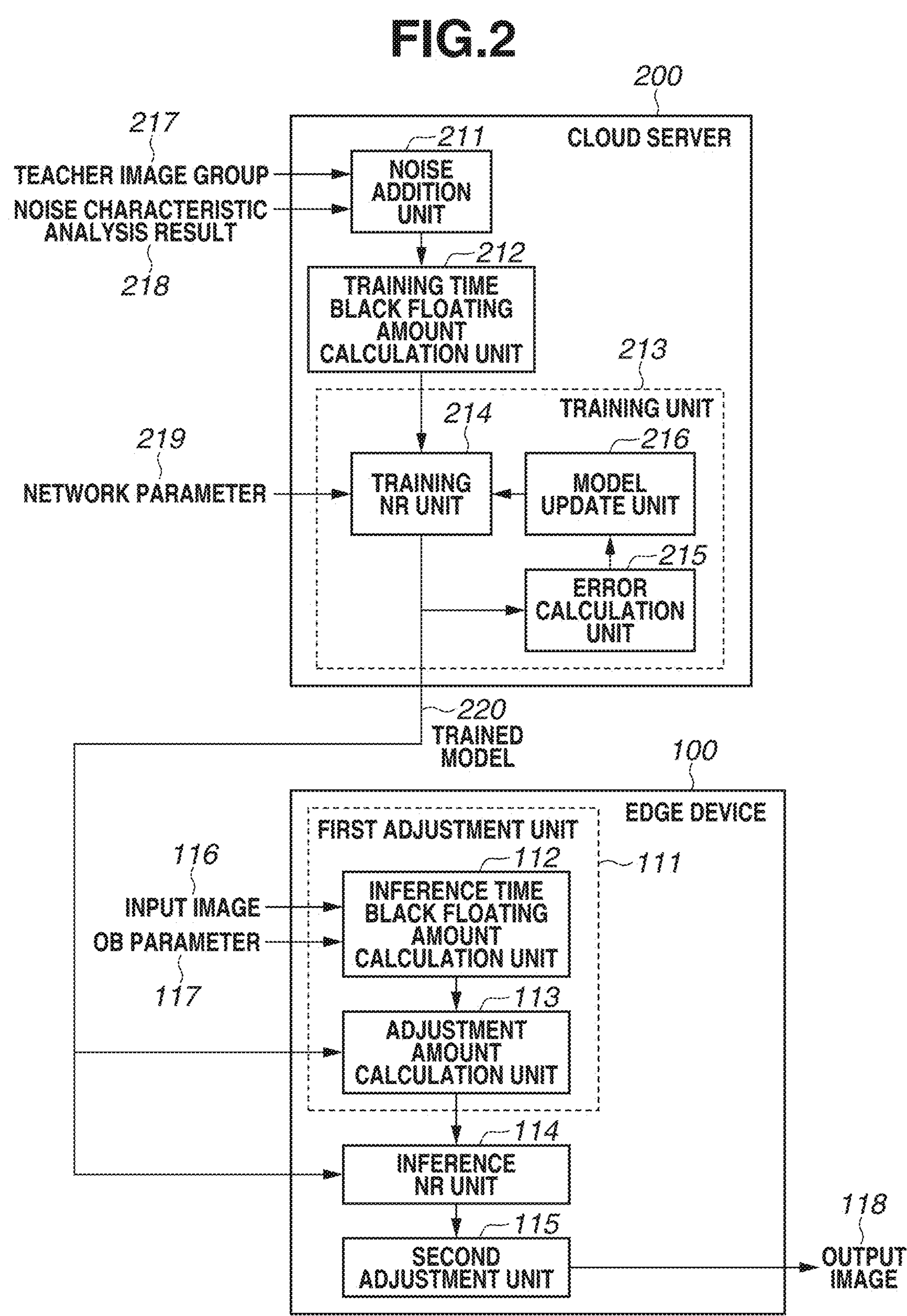
FIG. 2 is a functional block diagram illustrating an information processing system according to a first exemplary embodiment.

Next, with reference to FIG. 2, functional blocks of the entire information processing system according to the present exemplary embodiment will be described. As illustrated in FIG. 2, the edge device 100 includes a first adjustment unit 111, an inference NR unit 114, and a second adjustment unit 115, and the first adjustment unit 111 includes an inference time black floating amount calculation unit 112 and an adjustment amount calculation unit 113.

Further, the cloud server 200 includes a noise addition unit 211, a training time black floating amount calculation unit 212, and a training unit 213, and the training unit 213 includes a training NR unit 214, an error calculation unit 215, and a model update unit 216.

In addition, the configuration illustrated in FIG. 2 can be modified or changed as appropriate. For example, one functional block may be divided into a plurality of functional blocks, or two or more functional blocks may be integrated into one functional block. Further, the configuration illustrated in FIG. 2 may be achieved by two or more apparatuses. In this case, the apparatuses are connected via a circuit or a wired or wireless network, and perform collaborative operations by performing data communications with each other to implement processing described below.

First, the functional blocks of the edge device 100 will be described in detail.

The first adjustment unit 111 acquires an input image 116 and adjusts an offset of the input image 116 using a black floating amount calculated from an optical black (OB) region.

In the present exemplary embodiment, the OB region is a region shielded from light with a metal film or the like in an image sensor. The OB region and the black floating will be described in detail.

In general, in an image sensor, electrons in silicon excited with light energy by irradiating, with light, photodiodes formed on a silicon substrate are read as an image signal. Since the image sensor has such a characteristic, it is desirable that, in a state where the photodiodes are not irradiated with light, a signal level of an image signal read from each of the photodiodes becomes 0. In addition, the signal level of the image signal read from each of the photodiodes in the state where the photodiodes are not irradiated with light corresponds to the black level.

However, even in a case where the light incident on the photodiodes is perfectly shielded, there may be a case where the signal level read from each of the shielded photodiodes does not become 0. As a specific example, there is a case where the signal level read from each of the shielded photodiodes does not become 0 due to influences of dark current and readout noise. The dark current and the readout noise are difficult to measure in advance because, for example, the dark current and the readout noise change every second depending on temperature and a status of a power supply.

Figure 3:
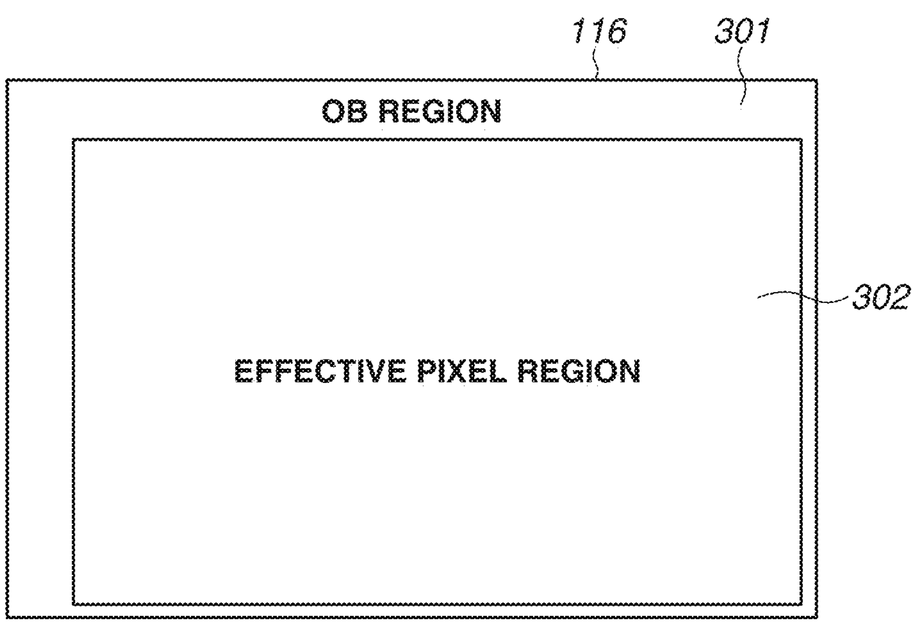
FIG. 3 is a schematic diagram illustrating an input image.

In consideration of such a situation, the image sensor is provided with a region referred to as an OB region shielded from light with a metal film or the like near an opened region (hereinbelow, referred to as an effective pixel region). FIG. 3 illustrates the input image 116 obtained with such an image sensor. The input image 116 includes an OB region 301 and an effective pixel region 302. The offset including the influences of the dark current and the readout noise in a state where no light is incident can be recognized by analyzing the pixel values of the OB region 301. More specifically, the black level can be corrected to be 0 by subtracting the offset from each of the pixel values of the effective pixel region 302. In fact, a setting value is input to the offset in advance, and usually the setting value is subtracted from each of the pixel values of the effective pixel region 302.

Figures 4A, 4B, 4C:
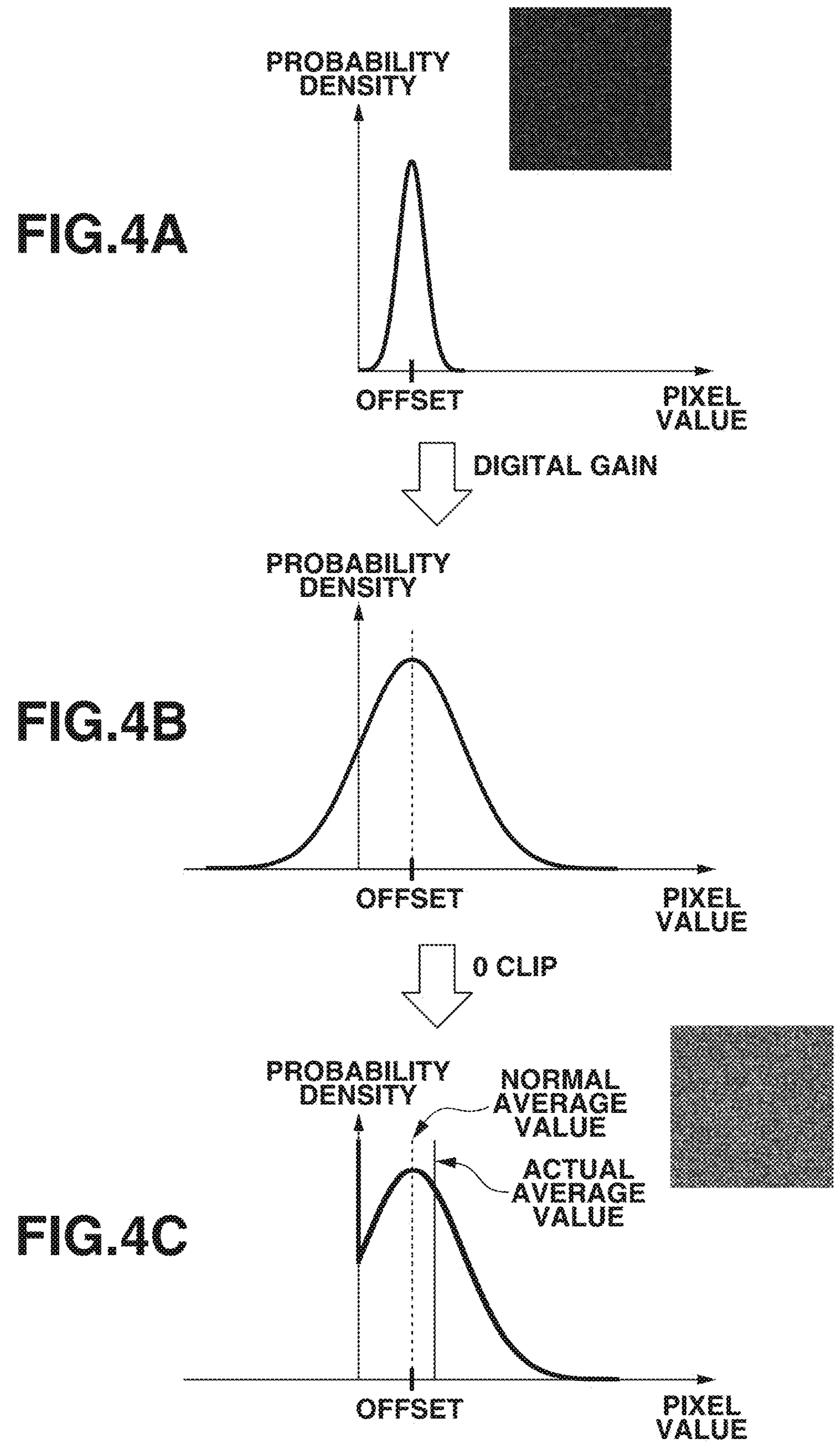
FIGS. 4A, 4B, and 4C are schematic diagrams illustrating a black floating.

Next, the black floating will be described with reference to FIGS. 4A, 4B, and 4C. FIG. 4A illustrates a distribution of pixel values in the OB region in a case where image capturing is performed under a condition in which no digital gain is applied, and a rectangular image is an example of the OB region. The horizontal axis represents pixel values of the pixels in the OB region, and the vertical axis represents probability densities each corresponding to a pixel value. Further, the distribution is centered around the offset due to the influences of the dark current and the readout noise.

On the other hand, FIG. 4B illustrates a distribution of the pixel values in the OB region in a case where a digital gain is applied to the condition in FIG. 4A. Compared with FIG. 4A, the distribution spreads so that some pixel values have a negative value, but actually the pixel values cannot have a negative value due to the hardware configuration. Thus, as illustrated in FIG. 4C, the negative value is clipped to 0. In this way, the average value that has been a value near the offset is shifted in the positive direction. As a result, “black” is not displayed correctly, and the OB region becomes brighter as the rectangular image in FIG. 4C. This is the black floating.

The above is the detailed description of the OB region and the black floating.

The description will return to the first adjustment unit 111. In the present exemplary embodiment, a RAW image is used as the input image 116. Each pixel of the RAW image has a pixel value corresponding to any one of RGB colors. Hereinbelow, a description is given on an assumption that the RAW image is captured using a Bayer array color filter in which each pixel has information corresponding to one color.

The inference time black floating amount calculation unit 112 acquires the input image 116 and an OB parameter 117, and calculates the black floating amount in the OB region in the input image 116. The OB parameter 117 stores coordinates of the OB region and the offset set in advance. The black floating amount is calculated from a difference value between the offset and an average value of all the pixel values of pixels included in the OB region.

The adjustment amount calculation unit 113 adjusts the offset of the input image 116. More specifically, the adjustment amount calculation unit 113 obtains a difference value by subtracting the offset of the input image 116 calculated by the inference time black floating amount calculation unit 112 from a black floating suppression amount (details thereof will be described below) stored in a trained model 220, and adds the difference value to the input image 116. In a case where the difference value is positive, i.e., the black floating suppression amount is larger than the black floating amount of the input image 116, the offset of the input image 116 is adjusted to be larger. On the other hand, in a case where the difference value is negative, i.e., the black floating suppression amount is smaller than the black floating amount of the input image 116, the offset of the input image 116 is adjusted to be smaller. In this way, the adjustment is performed so that the black floating of the input image 116 and the black floating of the image used at the time of training of the trained model become almost the same level, or at least come closer.

Figures 5A, 5B:
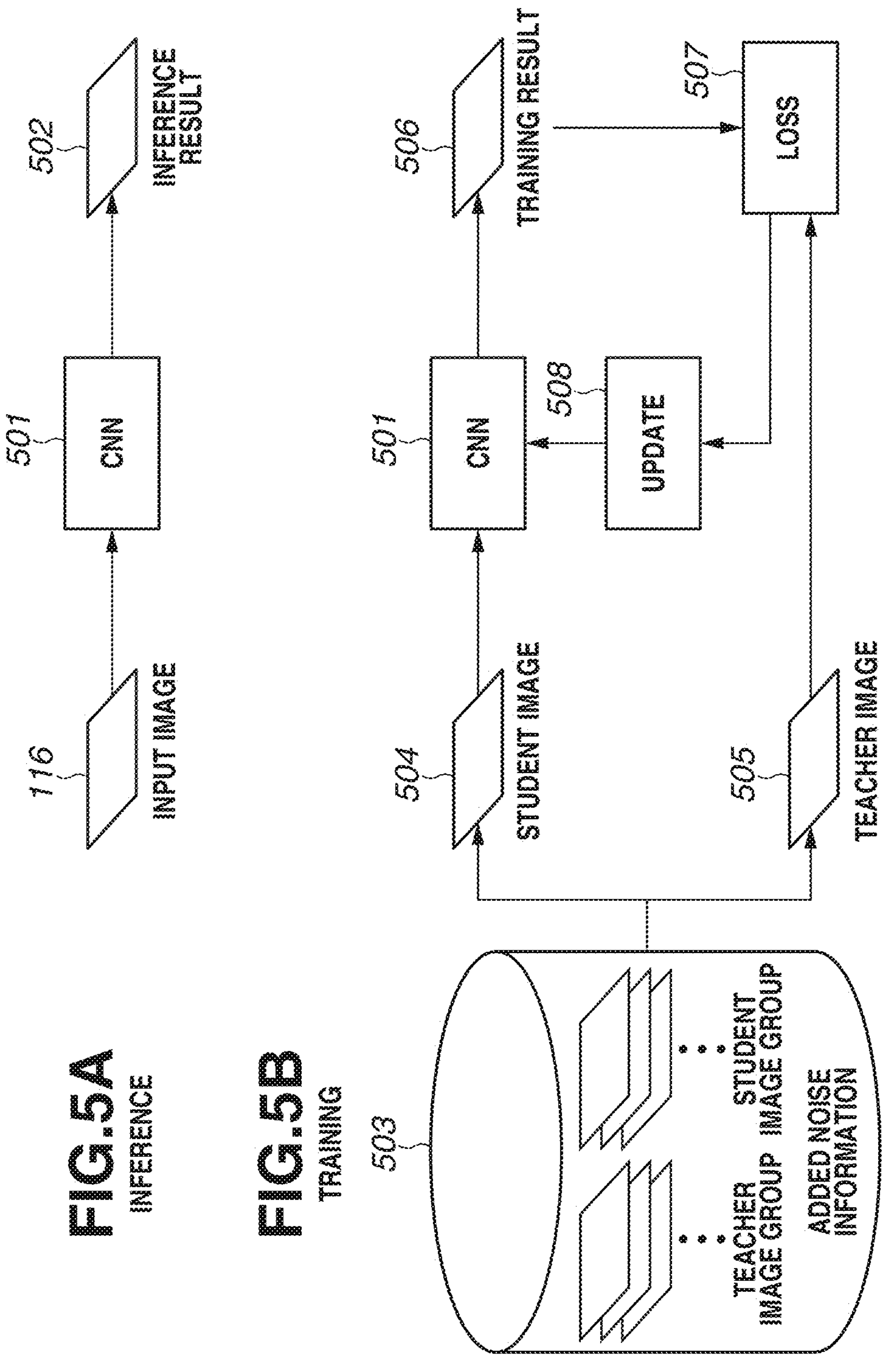
FIGS. 5A and 5B are schematic diagrams illustrating flows of inference and training, respectively.

The inference NR unit 114 performs an NR inference to reduce noise in the input image 116 after the above-described adjustment using the trained model 220 received from the cloud server 200. With reference to FIG. 5A, the NR inference will be described in detail.

The inference NR unit 114 inputs the input image 116 to a CNN 501, repeats a convolution operation using a filter of the formulas (1) and (2) and a non-linear operation a plurality of times, and outputs an inference result 502.

Figure 6:
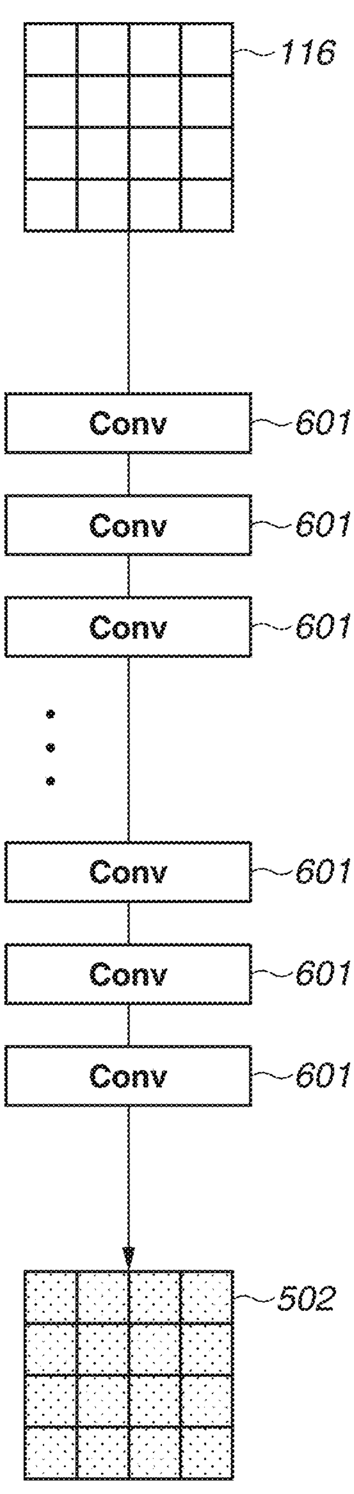
FIG. 6 is a schematic diagram illustrating a structure of a convolutional neural network (CNN).

FIG. 6 is a diagram illustrating a structure of the CNN 501. Hereinbelow, the CNN 501 will be described with reference to FIG. 6. The CNN 501 is configured of a plurality of filters 601 for performing the operation of the above-described formula (1). First, the input image 116 is input to the CNN 501. Next, the filters 601 are successively applied to the input image 116 to calculate a feature map (not illustrated). Then, a result obtained by applying the last filter 601 is the inference result 502.

The second adjustment unit 115 adjusts the offset with respect to the inference result 502 and outputs an output image 118. More specifically, the second adjustment unit 115 subtracts the difference value calculated by the adjustment amount calculation unit 113 from the noise-reduced image. The processing is performed so as not to influence subsequent image processing, such as gamma correction or white balance correction. Since the gamma correction or the white balance correction is usually performed after subtracting the offset originally set to the input image 116, if the offset is shifted from the original value, the correction cannot be appropriately performed.

Figure 7:
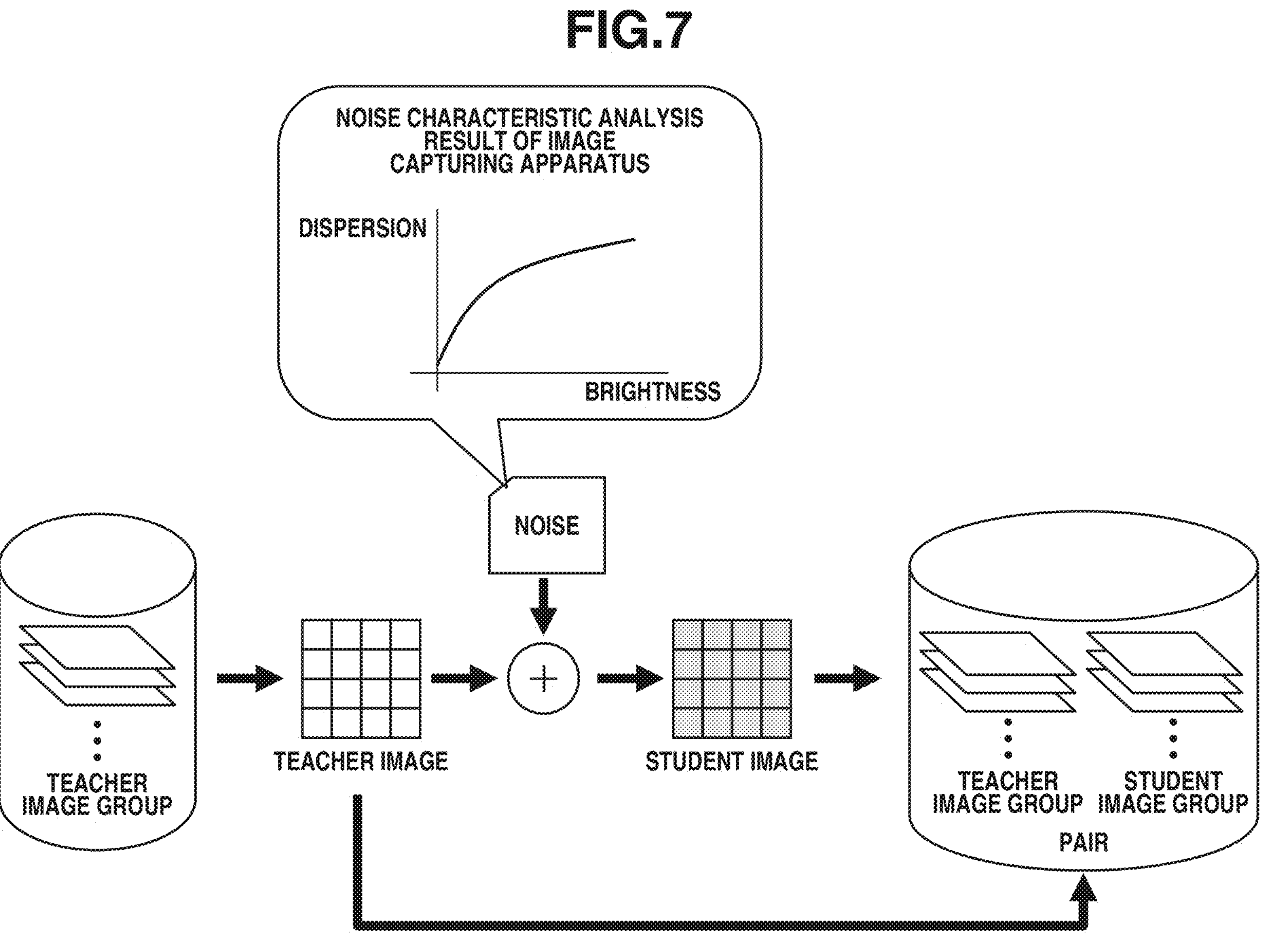
FIG. 7 is a schematic diagram illustrating a flow of noise addition processing.

Next, the functional blocks of the cloud server 200 will be described in detail. As illustrated in FIG. 7, the noise addition unit 211 generates a student image by adding noise to a teacher image extracted from a teacher image group 217 using a noise characteristic analysis result 218 of the image capturing apparatus 10.

Then, a pair of the teacher image and the student image is set as training data. At this time, the black floating is generated in the student image due to the influence of the noise and because the pixel value is clipped at 0 so as not to have a negative value.

The teacher image group 217 stores various kinds of image data, such as nature pictures including landscapes or animals, person pictures such as portraits and sports pictures, and artificial structure pictures such as building pictures and product pictures. In the present exemplary embodiment, the same as the input image 116, RAW image data including pixels each having a pixel value corresponding to any one of RGB colors is used. Further, the noise characteristic analysis result 218 includes, for example, an amount of noise for each sensitivity, generated from the sensor mounted in the image capturing apparatus 10. It is possible to estimate the amount of generated noise for each image capturing condition by using recorded data. Thus, an image equivalent to the image acquired by image capturing can be generated by adding, to the teacher image data, the noise estimated to be generated under a certain image capturing condition.

The training time black floating amount calculation unit 212 calculates a black floating amount from the student image generated by the noise addition unit 211. More specifically, the training time black floating amount calculation unit 212 calculates the black floating amount from the student image generated by adding noise to the teacher image all the pixels of which have the same pixel values as the offset. The black floating amount is a difference value between the offset and the average value of all the pixel values of pixels included in the student image.

The training unit 213 initializes a weight of the CNN 501 using a received network parameter 219 and then performs an NR training using the training data generated by the noise addition unit 211. The NR training is performed by the training NR unit 214, the error calculation unit 215, and the model update unit 216. Details thereof will be described with reference to FIG. 5B.

The training NR unit 214 receives training data 503 from the noise addition unit 211 and reduces the noise in a student image 504. More specifically, first, the student image 504 is input to the CNN 501, and the CNN 501 repeats a convolution operation using the filter of formulas (1) and (2) and a non-linear operation a plurality of times, and outputs a training result 506.

Figure 8A:
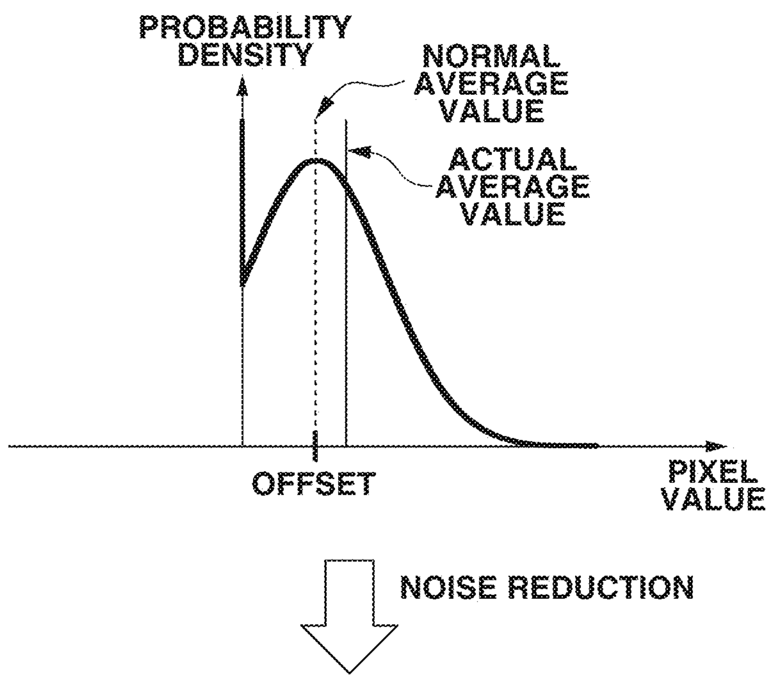
FIGS. 8A and 8B are schematic diagrams illustrating noise reduction processing according to the first exemplary embodiment.
Figure 8B:
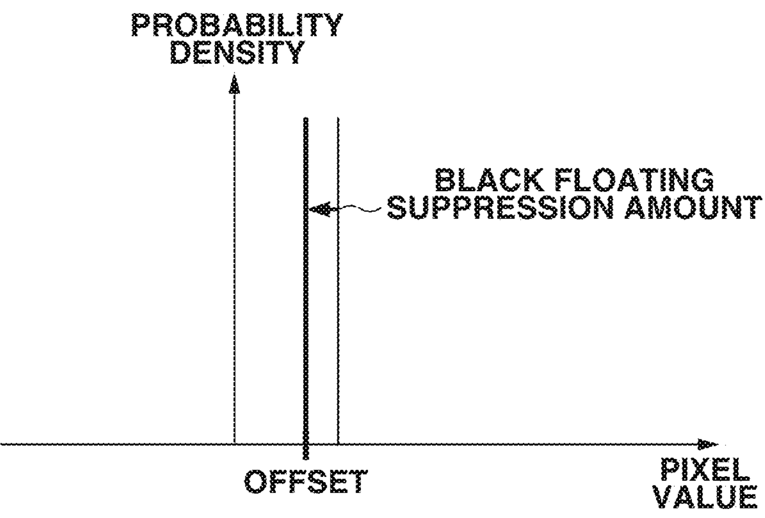

At this time, in addition to the amount of reducing the noise, the training NR unit 214 learns a black floating suppression amount. The black floating suppression amount is an amount of adjusting the pixel value shifted due to the black floating to a value near the set offset. In other words, the black floating suppression amount is an amount of determining how much to add to or subtract from the offset of the input image 116. Hereinbelow, with reference to FIGS. 8A and 8B, the black floating suppression amount will be described in detail. FIG. 8A is the same as FIG. 4C. When a noise reduction is performed on an OB region in which the black floating is generated, the pixel value normally converges to a value slightly shifted to a positive direction from the offset, and the black floating remains. However, in a case where the cloud server 200 is trained so as to suppress the black floating, in addition to reducing the noise, this issue can be solved.

A black image with an offset prepared in advance and to which a digital gain is applied is inferred using the trained model, and a difference value between an average value of pixel values of pixels included in an entire image before the inference and an average thereof after the inference is determined as the black floating suppression amount. A black bold line indicated by a black arrow directing leftward in FIG. 8B indicates the black floating suppression amount.

Next, the error calculation unit 215 inputs a teacher image 505 and the training result 506 to a loss 507, and calculates an error therebetween. At this time, the student image 504, the teacher image 505, and the training result 506 have the same number of pixels. At the end, the model update unit 216 inputs the calculated error to an update 508 to update the network parameter related to the CNN 501 so as to reduce the error.

The CNN 501 used by the training NR unit 214 is the same neural network as the CNN 501 used by the inference NR unit 114.

<Processing Flow in Entire System>

Figure 9A:
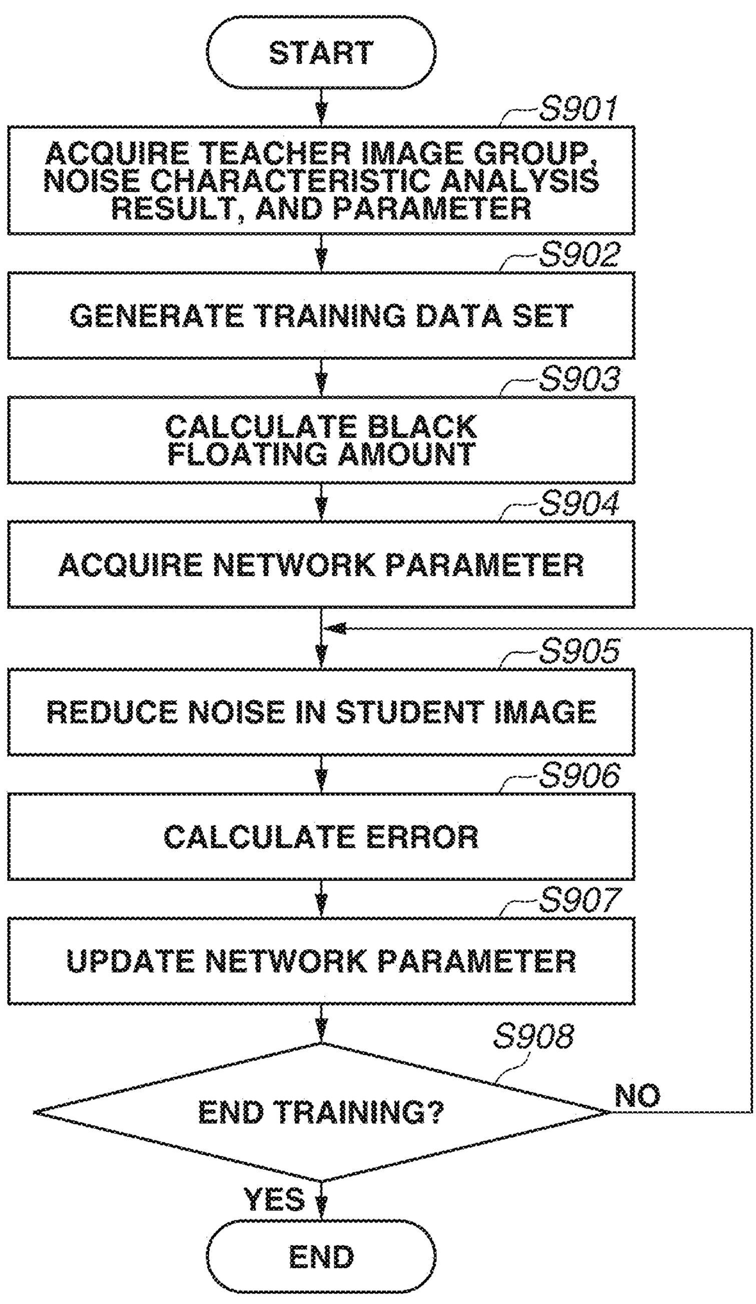
FIGS. 9A and 9B are flowcharts illustrating processing performed in the information processing system according to the first exemplary embodiment.
Figure 9B:
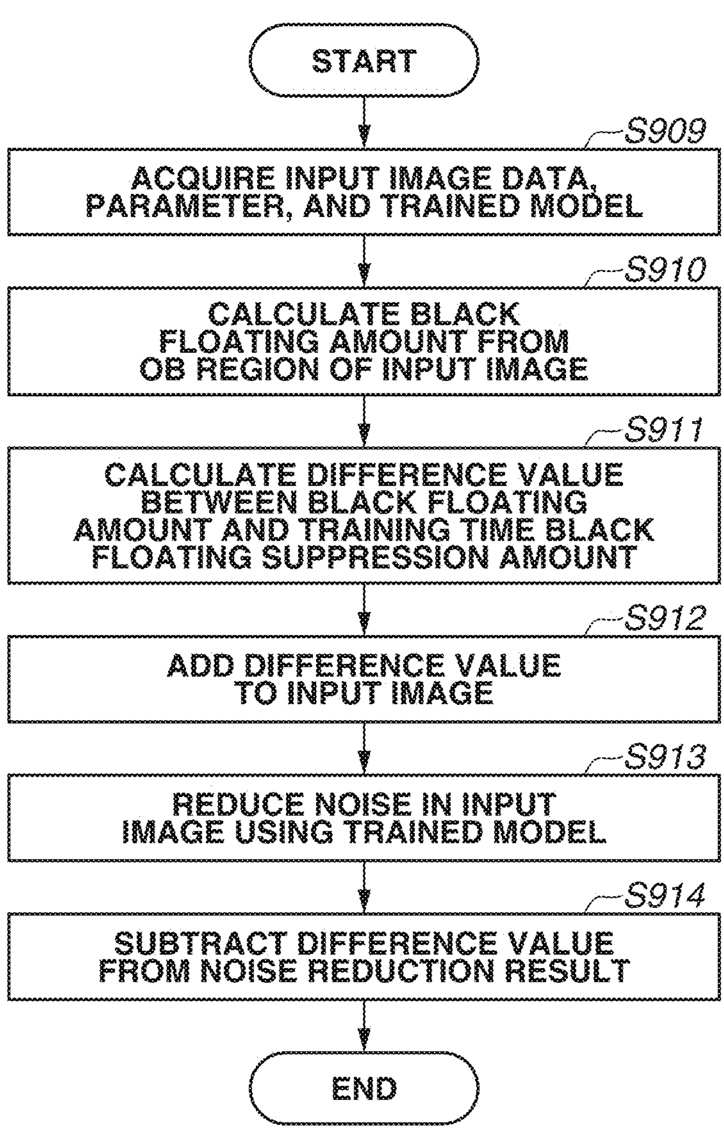

Next, with reference to FIGS. 9A and 9B, various kinds of processing performed in the information processing system according to the present exemplary embodiment will be described. FIGS. 9A and 9B are flowcharts illustrating processing flows in the information processing system. The functional blocks illustrated in FIG. 2 are implemented by the CPU 101 executing computer programs corresponding to the respective functional blocks. However, all or a part of the functional blocks illustrated in FIG. 2 may be implemented using hardware components. Hereinbelow, the processing flows of FIGS. 9A and 9B will be described.

First, with reference to FIG. 9A, an example of the NR training will be described.

In step S901, the teacher image group 217 and the noise characteristic analysis result 218 of the image capturing apparatus 10 are input to the cloud server 200. The teacher image 505 is a Bayer array RAW image and is acquired, for example, by the image capturing apparatus 10 capturing an image. Not limited to this method, an image captured by the image capturing apparatus 10 may be directly uploaded, or a previously captured image stored in an HDD or the like may be uploaded.

The data of the teacher image group 217 input to the cloud server 200 and the noise characteristic analysis result 218 of the image capturing apparatus 10 are sent to the noise addition unit 211.

In step S902, the noise addition unit 211 adds noise to the teacher image 505 to generate a student image 504, using the teacher image group 217 and the noise characteristic analysis result 218 of the image capturing apparatus 10 input in step S901, and generates a training data set including the teacher image 505 and the student image 504 as a pair. At this time, the noise is added in a predetermined order or at random.

In step S903, the training time black floating amount calculation unit 212 calculates a black floating amount from the student image 504 generated in step S902.

In step S904, a network parameter to be applied to the CNN 501 for the NR training is input to the cloud server 200. The network parameter includes an initial value of a parameter of the neural network and a hyper parameter indicating a structure of the neural network and an optimization method. The input network parameter is sent to the training unit 213.

In step S905, the training NR unit 214 initializes a weight of the CNN 501 using the received network parameter, and then reduces the noise in the student image generated in step S902 to obtain the training result 506.

In step S906, the error calculation unit 215 calculates an error between the training result 506 and the teacher image 505 using the loss function of the formula (3).

In step S907, the model update unit 216 updates the network parameter so as to reduce the error obtained as described above in step S906.

In step S908, the training unit 213 determines whether to end the training. For example, the training unit 213 may determine to end the training in a case where the number of times of update of the network parameter reaches a predetermined number of times. In a case where the training unit 213 determines not to end the training (NO in step S908), the processing returns to step S905, and the training is performed using other training data. In a case where the training unit 213 determines to end the training (YES in step S908), the processing ends.

Next, with reference to FIG. 9B, an example of the NR inference will be described.

In step S909, the trained model 220 trained by the cloud server 200, the OB parameter 117 used for calculating the black floating amount, and the Bayer array RAW image to be a target of the NR inference serving as the input image 116 are input to the edge device 100. For example, the RAW image captured by the image capturing apparatus 10 may be directly input, or the RAW image captured in advance and stored in the large-capacity storage device 104 may be read. The trained model 220 is sent to the adjustment amount calculation unit 113 and the inference NR unit 114, and both the input image 116 and the OB parameter 117 are sent to the inference time black floating amount calculation unit 112.

In step S910, the inference time black floating amount calculation unit 112 calculates a black floating amount from the OB region of the input image 116.

In step S911, the adjustment amount calculation unit 113 calculates a difference value between the black floating amount calculated in step S910 and the black floating suppression amount stored in the trained model 220 acquired in step S909.

In step S912, the adjustment amount calculation unit 113 adds the difference value calculated in step S911 to the input image 116.

In step S913, the inference NR unit 114 performs an NR inference to reduce the noise in the input image 116 using the trained model 220, and obtains the inference result 502. At this time, the existing network parameter is initialized with the updated network parameter received from the cloud server 200. Then, the input image 116 is input to the CNN 501 to which the updated network parameter is applied to perform the NR inference.

In step S914, the second adjustment unit 115 subtracts the difference value calculated in step S911 from the inference result 502 obtained in step S913. In this way, the second adjustment unit 115 outputs a result in which the noise is reduced while the black floating is suppressed as the output image 118.

As above, the entire processing flow performed in the information processing system according to the present exemplary embodiment has been described. In this way, when a trained model obtained through noise reduction training is used, it is possible to appropriately reduce noise in an input image in which the black floating different from that at the time of training is generated.

While the training data is generated in step S902, the training data may be generated in a subsequent step. More specifically, the student image corresponding to the teacher image may be generated in a subsequent NR training.

While, in the present exemplary embodiment, the training is performed from the beginning using the data from the teacher image group prepared in advance, the processing according to the present exemplary embodiment may be performed based on a trained network parameter.

Further, in the present exemplary embodiment, the RAW image captured with the Bayer array color filter is described, but other color filter arrays may be used. Further, the image data format is not limited to the RAW image, and, for example, the image data format may be a demosaic RGB image.

While, in the present exemplary embodiment, the example of the input image including the OB region is described, in a case where an image includes no OB region, the black floating amount may be calculated from an image captured by shielding the image capturing apparatus 10 from light (light shielded image capturing), for example, by placing the image capturing apparatus 10 in a dark room or by attaching a lens cap.

In the present exemplary embodiment, the example of adjusting the offset by the second adjustment unit 115 after the NR inference is performed is described. This is the processing performed not to affect the subsequent image processing.

However, if the subsequent image processing is performed taking the adjusted offset into consideration, the processing by the second adjustment unit 115 may be skipped.

In the first exemplary embodiment, the description is given of the embodiment of appropriately reducing the noise in the input image, in which the black floating different from that at the time of training is generated, when the trained model obtained through the noise reduction training is used. In a second exemplary embodiment, a description is given of a method for reducing noise and suppressing the black floating even in a case where there is no information about the trained model at the time of training. In addition, in the present exemplary embodiment, the description is given on an assumption that the trained model is a model that reduces noise. Further, descriptions of contents common with those in the first exemplary embodiment, such as a basic structure of the information processing system, are omitted, and differences will be mainly described.

Figure 10:
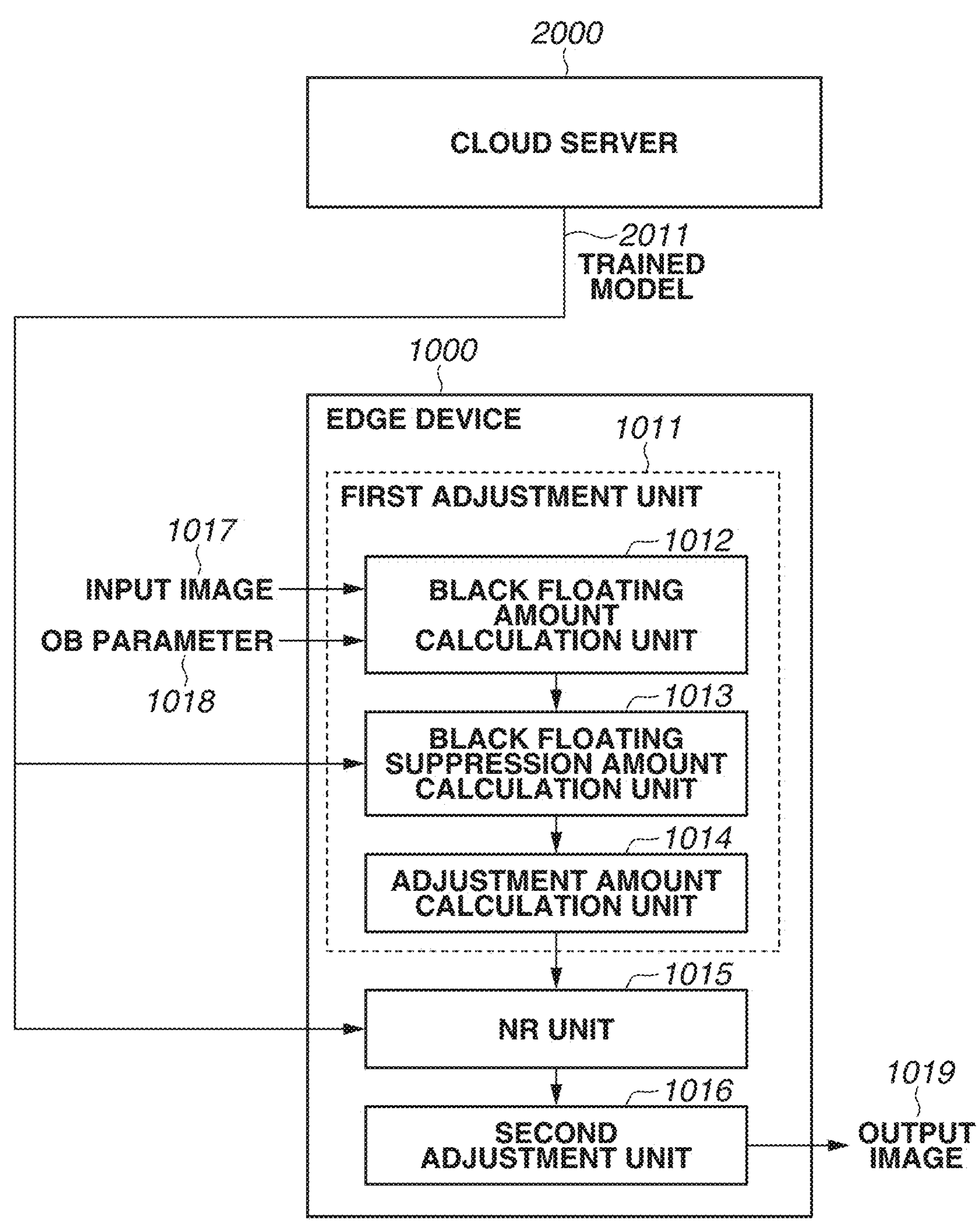
FIG. 10 is a functional block diagram illustrating an information processing system according to a second exemplary embodiment.

FIG. 10 is a block diagram illustrating a functional configuration of an entire information processing system according to the present exemplary embodiment. As illustrated in FIG. 10, an edge device 1000 includes a first adjustment unit 1011, an NR unit 1015, and a second adjustment unit 1016, and the first adjustment unit 1011 includes a black floating amount calculation unit 1012, a black floating suppression amount calculation unit 1013, and an adjustment amount calculation unit 1014.

Hereinbelow, the functional blocks of the edge device 1000 will be described in detail.

The first adjustment unit 1011 acquires an input image 1017, and adjusts an offset of the input image 1017 using a black floating amount calculated from an OB region and a black floating suppression amount of a trained model 2011 received from a cloud server 2000.

The black floating amount calculation unit 1012 performs the same processing as that performed by the inference time black floating amount calculation unit 112 in the first exemplary embodiment.

The black floating suppression amount calculation unit 1013 calculates a black floating suppression amount from the acquired trained model 2011. More specifically, first, an image including pixels all of which have a same pixel value as the offset of the input image 1017 is prepared, and noise is added to the image. Next, an NR inference is performed on the noise-added image using the trained model 2011. Then, the black floating suppression amount calculation unit 1013 calculates a difference value between an average value of pixel values of all the pixels included in an image before inference and an average value thereof after the inference, and determines the difference value as the black floating suppression amount.

It is also possible to perform the above processing in a plurality of patterns by changing the noise amount to be added, calculate the black floating suppression amount every time, and create a lookup table (LUT) including the noise amounts and the black floating suppression amounts. In this case, when the same trained model is used, it is not required to calculate a new black floating suppression amount, and it is only required to refer to the LUT.

The adjustment amount calculation unit 1014 performs processing similar to that performed by the adjustment amount calculation unit 113 according to the first exemplary embodiment, and is different only in that the adjustment amount calculation unit 1014 uses the black floating suppression amount calculated by the black floating suppression amount calculation unit 1013.

The NR unit 1015 performs the same processing as that performed by the inference NR unit 114 according to the first exemplary embodiment.

The second adjustment unit 1016 performs the same processing as that performed by the second adjustment unit 115 according to the first exemplary embodiment.

<Processing Flow in Entire System>

Figure 11:
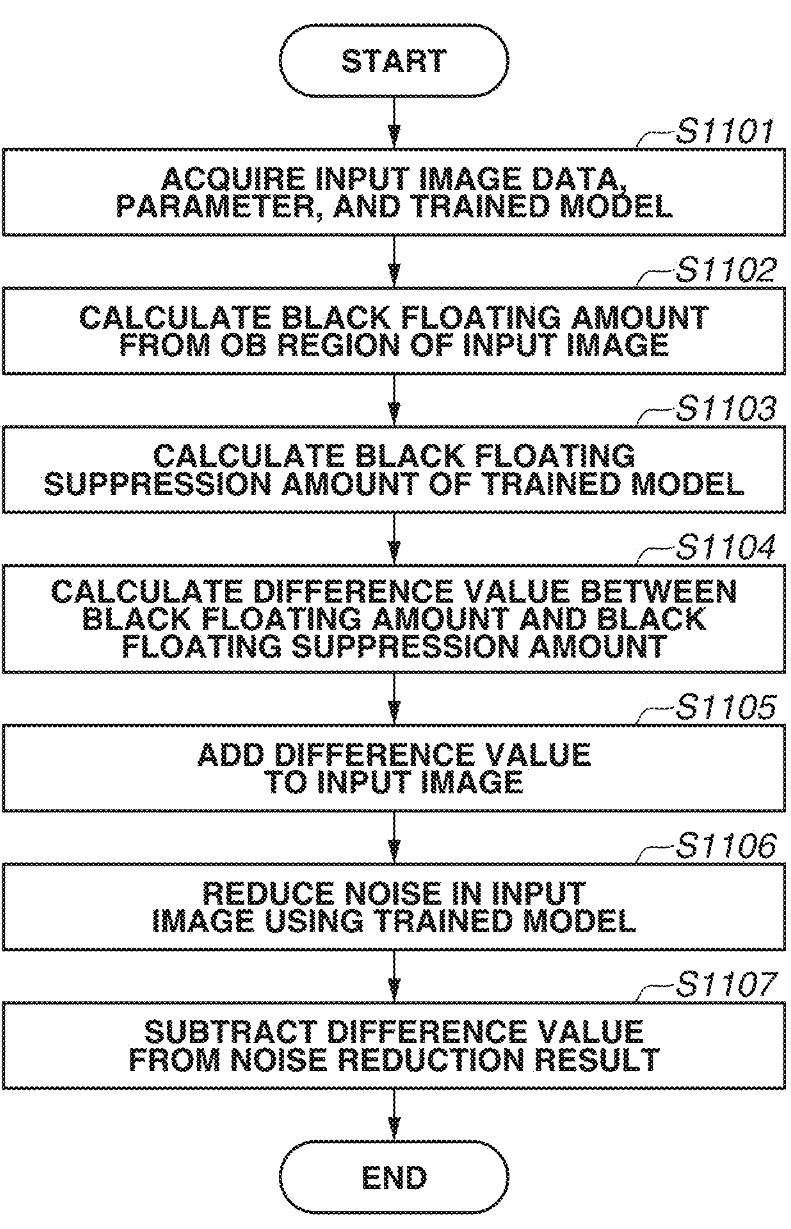
FIG. 11 is a flowchart illustrating processing performed in the information processing system according to the second exemplary embodiment.

Next, with reference to FIG. 11, various kinds of processing performed in the information processing system according to the present exemplary embodiment will be described. FIG. 11 is a flowchart illustrating a processing flow in the information processing system. The functional blocks illustrated in FIG. 11 are implemented by the CPU 101 executing computer programs corresponding to the respective functional blocks.

Hereinbelow, with reference to the flowchart in FIG. 11, the processing flow performed in the edge device 1000 according to the present exemplary embodiment will be described.

In step S1101, the trained model 2011 trained by the cloud server 2000, an OB parameter 1018 used for calculating a black floating amount, and a Bayer array RAW image to be a target of the NR inference serving as the input image 1017 are input to the edge device 100. The trained model 2011 is sent to the black floating suppression amount calculation unit 1013 and the NR unit 1015, and both the input image 1017 and the OB parameter 1018 are sent to the black floating amount calculation unit 1012.

In step S1102, the black floating amount calculation unit 1012 calculates the black floating amount from the OB region of the input image 1017.

In step S1103, the black floating suppression amount calculation unit 1013 calculates a black floating suppression amount of the trained model 2011.

In step S1104, the adjustment amount calculation unit 1014 calculates a difference value between the black floating amount calculated in step S1102 and the black floating suppression amount calculated in step S1103.

In step S1105, the adjustment amount calculation unit 1014 adds the difference value calculated in step S1104 to the input image 1017.

In step S1106, the NR unit 1015 performs the NR inference to reduce noise in the input image 1017 using the trained model 2011, and obtains an inference result.

In step S1107, the second adjustment unit 1016 subtracts the difference value calculated in step S1104 from the inference result obtained in step S1106. In this way, the second adjustment unit 1016 outputs a result in which the noise is reduced while the black floating is suppressed as an output image 1019.

As described above, the entire processing flow performed in the information processing system according to the present exemplary embodiment has been described. In this way, it is possible to reduce the noise while suppressing the black floating even in the case where there is no information at the time of training, such as a black floating suppression amount of the trained model.

[Modification Example]

In the first and second exemplary embodiments, the examples of adjusting the offset of the input image from the black floating amount of the input image and the black floating suppression amount of the trained model are described. When the offset is once adjusted, the same adjustment value can be used for a certain length of time. However, when the image capturing apparatus 10 is continuously used for a long time, the noise amount and the black floating amount change due to an increase in temperature of a sensor, and a readjustment of the offset becomes necessary. Thus, a function of issuing a notification of a readjustment timing for the offset may be provided. Examples of the timing for performing the readjustment include when the black floating amount has exceeded a predetermined threshold value, and when a predetermined time has elapsed since a start of the inference processing. In addition, the readjustment may be performed at constant intervals. Further, the readjustment of the offset may be automatically performed when a notification is received. In this way, it is possible to appropriately reduce the noise while suppressing the black floating even in the case where the black floating amount has varied.

The present disclosure can be realized by processing of supplying a program for implementing one or more functions of the above-described exemplary embodiments to a system or an apparatus via a network or a storage medium, and causing one or more processors in the system or the apparatus to read and execute the program. Further, the present disclosure can also be realized by a circuit (e.g., application specific integrated circuit (ASIC)) that can implement one or more functions.

With the technique of the present disclosure, it is possible to appropriately reduce noise in a processing target image while suppressing a black floating thereof even in a case where a black floating amount is different from that at the time of training.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-046064, filed Mar. 22, 2023, which is hereby incorporated by reference herein in its entirety.

What is claimed is:

1. An information processing apparatus configured to reduce noise in an image using a trained neural network, the information processing apparatus comprising:

at least one processor and at least one memory having instructions stored thereon that, when executed by the at least one processor, cause the at least one processor and the at least one memory to cooperate to:

adjust a black floating of an input image so as to be closer to a black floating of an image used at a time of training of the neural network; and perform inference processing on a noise-reduced image of the adjusted image, using the neural network trained to suppress the black floating, wherein the at least one processor and the at least one memory further cooperate to calculate the black floating of the input image from a difference value between a black floating amount obtained from an optical black region of the input image and a black floating suppression amount of the neural network.

2. The information processing apparatus according to claim 1, wherein the at least one processor and the at least one memory further cooperate to add the difference value to the input image.

3. The information processing apparatus according to claim 1, wherein the difference value takes a positive value in a case where the black floating suppression amount is larger than the black floating amount, and takes a negative value in a case where the black floating suppression amount is smaller than the black floating amount.

4. The information processing apparatus according to claim 1, wherein the at least one processor and the at least one memory further cooperate to subtract the difference value from the noise-reduced image.

5. The information processing apparatus according to claim 1, wherein the at least one processor and the at least one memory further cooperate to calculate the black floating of the input image at a predetermined timing.

6. The information processing apparatus according to claim 5, wherein the predetermined timing is a timing at a regular interval from a start of the inference processing, or a timing at which the black floating exceeds a predetermined threshold value.

7. The information processing apparatus according to claim 1, wherein the neural network holds the black floating amount for each sensitivity used when the input image is captured.

8. The information processing apparatus according to claim 1, wherein the black floating suppression amount is calculated from a difference value between an average value of pixel values of pixels included in an image captured in a light shielded state and an average value of pixel values of pixels included in the noise-reduced image obtained by reducing noise in the image using the neural network.

9. An information processing apparatus configured to reduce noise in an image using a trained neural network, the information processing apparatus comprising:

at least one processor and at least one memory having instructions stored thereon that, when executed by the at least one processor, cause the at least one processor and the at least one memory to cooperate to:

adjust a black floating of an input image so as to be closer to a black floating of an image used at a time of training of the neural network; and perform inference processing on a noise-reduced image of the adjusted image, using the neural network trained to suppress the black floating, wherein the at least one processor and the at least one memory further cooperate to calculate the black floating of the input image from a difference value between a black floating amount obtained from an image captured in a light shielded state and a black floating suppression amount of the neural network.

10. An information processing method for reducing noise in an image using a trained neural network, the information processing method comprising:

adjusting a black floating of an input image so as to be closer to a black floating of an image used at a time of training of the neural network; and performing inference processing on a noise-reduced image of the adjusted image, using the neural network trained to suppress the black floating, wherein the black floating of the input image is calculated from a difference value between a black floating amount obtained from an optical black region of the input image and a black floating suppression amount of the neural network.

11. A system configured to reduce noise in an image using a trained neural network, the system comprising:

at least one processor and at least one memory having instructions stored thereon that, when executed by the at least one processor, cause the at least one processor and the at least one memory to cooperate to:

adjust a black floating of an input image so as to be closer to a black floating of an image used at a time of training of the neural network; and perform inference processing on a noise-reduced image of the adjusted image, using the neural network trained to suppress the black floating, wherein the at least one processor and the at least one memory further cooperate to calculate the black floating of the input image from a difference value between a black floating amount obtained from an optical black region of the input image and a black floating suppression amount of the neural network.

* * * * *